(12) United States Patent
Kaftan et al.

(10) Patent No.: US 7,646,903 B2
(45) Date of Patent: Jan. 12, 2010

(54) SYSTEM AND METHOD FOR PATH BASED TREE MATCHING

(75) Inventors: Jens N. Kaftan, Moenchengladbach (DE); Atilla Peter Kiraly, Plainsboro, NJ (US); Carol L. Novak, Newtown, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 675 days.

(21) Appl. No.: 11/424,948

(22) Filed: Jun. 19, 2006

(65) Prior Publication Data

US 2007/0001879 A1 Jan. 4, 2007

Related U.S. Application Data

(60) Provisional application No. 60/692,954, filed on Jun. 22, 2005.

(51) Int. Cl.
*G06K 9/00* (2006.01)
*H03M 7/00* (2006.01)
(52) U.S. Cl. .................................. 382/128; 341/79
(58) Field of Classification Search ................ 382/128, 382/129, 130, 131, 132, 133, 134; 600/407, 600/431, 433; 128/920, 922; 341/79, 84
See application file for complete search history.

(56) References Cited

U.S. PATENT DOCUMENTS 6,839,714 B2 * 1/2005 Wheeler et al. ............. 707/102

2005/0107679 A1 * 5/2005 Geiger et al. ............... 600/407

OTHER PUBLICATIONS

B. Geiger, et al. "Virtual Bronchoscopy of Peripheral Nodules using Arteries as Surrogate Pathways," SPIE Physiology, function, and Structure From Medical Images. 5746 (2005).
A. P. Kiraly et al., "Three Dimensional Path Planning for Virtual Bronchoscopy," IEEE Trans. on Medical Imaging vol. 23 pp. 1365-1379 (2004).
Pisupati C. et al., "Tracking 3-D Pulmonary Tree Structures," Mathematical Methods in Biomedical Image Analysis, pp. 160-169 (1996).
Tschirren, J. et al., "Segmentation, Skeletonization, and Branchpoint Matching—A Fully Automated Quantitative Evaluation of Human Intrathoracic Airway Trees,"SPIE Medical Imaging 2003: Physiology and Function: Methods, Systems, and Applications, vol. 5031 pp. 187-194 (2003).
Mori, K. et al. "Automated Anatomical Labeling of the Bronchial Branch and Its Application to the Virtual Bronchoscopy System," IEEE Trans. on Medical Imaging vol. 19 pp. 103-114 (2000).
Kitaoka, H. et al., "Automated Nomenclature Labeling of the Bronchial Tree in 3D-CT Lung Images," Proceedings of the 5 International Conference on Medical Image Computing and Computer Assisted Intervention-Part II, pp. 1-11, (2002).

(Continued)

*Primary Examiner*—Abolfazl Tabatabai (57) ABSTRACT

A system and method for tree matching are provided. The method for tree matching includes: acquiring tree-like structures representing a physical object or model; extracting a path from a first tree-like structure and a path from a second tree-like structure; comparing the paths of the first and second tree-like structures by computing a similarity measurement for the paths; and determining if the paths match based on the similarity measurement.

25 Claims, 6 Drawing Sheets

OTHER PUBLICATIONS

Dumay, A.C.M. et al. "Consistent Inexact Graph Matching Applied to Labeling Coronary Segments in Arteriograms," Proc. 11 IAPRI, vol. III pp. 439-446 (1992).

Haris, K. et al."Model-based Morphological Segmentation and Labeling of Coronary Angiograms," IEEE Trans. on Medical Imaging vol. 18 pp. 1003-1015 (1999).

Pelillo M., "Matching Hierarchical Structures Using Association Graphs," IEEE Trans. on Pattern Analysis and Machine Intelligence, vol. 21, pp. 1105-1120 (1999).

Medasani S., et al. "Graph Matching by Relaxation of Fuzzy Assignments," IEEE Trans. on Fuzzy Systems, vol. 9, pp. 173-182 (2001).

Buelow, T., et al., "Automatic Extraction of the Pulmonary Artery Tree From Multi-Slice CT Data,"SPIE Physiology, Function, and Structure From Medical images, vol. 5746, pp. 730-740 (2005).

Kaftan, J.N. etc. "A Novel Multi-Purpose Tree and Path Matching Algorithm with Application to Airway Trees," SPIE Physiology, Function, and Structure From Medical images, vol. 6143 (2006).

* cited by examiner

SYSTEM AND METHOD FOR PATH BASED TREE MATCHING

CROSS-REFERENCE TO RELATED APPLICATION

This application claims the benefit of U.S. Provisional Application No. 60/692,954, filed Jun. 22, 2005, a copy of which is herein incorporated by reference.

BACKGROUND OF THE INVENTION

1. Technical Field

The present invention relates to tree matching algorithms, and more particularly, to a system and method for path-based tree matching for use with medical image processing applications.

2. Discussion of the Related Art

Tree matching algorithms have numerous applications in medical imaging including, inter alia, registration, anatomic labeling, segmentation, and navigation of structures such as vessels and airway trees.

In particular, tree matching algorithms can be used for the following purposes in lung imaging: airway-airway/artery-artery tree matching in images of the same patient taken at different times; airway-airway/artery-artery tree matching from different patients; airway-airway/artery-artery tree matching from a patient to an atlas to perform anatomic labeling; airway-artery matching within an image to determine correspondence between the two tree structures or to assist in detecting additional airways or arteries or for bronchoscopic navigation; and matching of veins to an atlas or to images of the same patient taken at different times.

Airway-airway and artery-artery matching within the same patient at different times can provide an important basis for image registration and automated quantitative analysis. For example, such matching enables automatic change measurement in bronchial wall thickness over time to monitor disease progression or response to treatment. Matching to an atlas can also ease several tasks for a radiologist. An example of this is described in K. Mori, J.-I. Hasegawa, "Automated Anatomical Labeling of the Bronchial Branch and Its Application to the Virtual Bronchoscopy System", IEEE Trans. on Medical Imaging, pp. 103-114, Vol. 19, February 2000, and H. Kitaoka, Y. Park, J. Tschirren, J. Reinhardt, "Automated Nomenclature Labeling of the Bronchial Tree in 3D-CT Lung Images", Proceedings of the 5$^{th}$ International Conference on Medical Image Computing and Computer Assisted Intervention-Part II, pp. 1-11, September 2002.

Atlas matching can be used to determine an anatomic name associated with a problem area identified on a radiologist's report. Matching with different patients allows for large-scale comparisons of the patient's data. Airway-artery matching within the same patient can be used for bronchoscopic navigation. Examples of this are described in B. Geiger, A. P. Kiraly, D. P. Naidich, C. L. Novak, "Virtual Bronchoscopy of Peripheral Nodules using Arteries as Surrogate Pathways", SPIE Physiology, Function, and Structure From Medical Images, Vol. 5746, 2005, B. Geiger, A. P. Kiraly, D. P. Naidich, C. L. Novak, "System and Method for Endoscopic Path Planning", U.S. Patent Application Publication No. 20050107679. Airway-artery matching within the same patient can also be used as a basis for improved artery or airway segmentation. An example of this is described in T. Buelow, R. Wiemker, T. Blaffert, C. Lorenz, S. Renisch, "Automatic Extraction of the Pulmonary Artery Tree from Multi-Slice CT Data", SPIE Physiology, Function, and Structure From Medical Images, pp. 730-740, Vol. 5746, 2005.

Tree matching algorithms require tree structures as input. This structure describes the tree as a series of branches interconnected through branch points. Several known algorithms can be used to obtain the tree structure including, inter alia, tracking, segmentation, and skeletonization. An example of this is described in A. P. Kiraly, J. P. Helferty, E. A. Hoffman, G. McLennan, and W. E. Higgins "3D Path Planning for Virtual Bronchoscopy", IEEE Trans. on Medical Imaging, pp. 1365-1379, Vol. 23, November 2004. Once the tree structure is obtained, the matching algorithm operates directly on the structure and any data contained therein. Any non-looping tree structure such as airways, arteries, and veins, contains an inherent hierarchy of parent and child branches. Such a tree can be viewed as a directed and branching graph.

There are several approaches to matching airway-airway trees from the same patient. Exemplary approaches are described in C. Pisupati, L. Wolff, W. Mitzner, E. Zerhouni, "Trackin 3-D Pulmonary Tree Structures", Mathematical Methods in Biomedical Image Analysis, pp. 160-169, 1996, and J. Tschirren, K. Palagyi, J. M. Reinhardt, E. A. Hoffman, and M. Sonka, "Segmentation, Skeletonization, and Branchpoint Matching—A Fully Automated Quantitative Evaluation of Human Intrathoracic Airway Trees", SPIE Medical Imaging 2003: Physiology and Function: Methods, Systems, and Applications, pp. 187-194, Vol. 5031, 2003.

In addition, there are several approaches for providing automated anatomical labeling of the bronchial tree. Examples of these approaches are described in K. Mori, J.-I. Hasegawa, "Automated Anatomical Labeling of the Bronchial Branch and Its Application to the Virtual Bronchoscopy System", IEEE Trans. on Medical Imaging, pp. 103-114, Vol. 19, February 2000 and H. Kitaoka, Y. Park, J. Tschirren, J. Reinhardt, "Automated Nomenclature Labeling of the Bronchial Tree in 3D-CT Lung Images", Proceedings of the 5$^{th}$ International Conference on Medical Image Computing and Computer Assisted Intervention-Part II, pp.1-11, September 2002.

Recent algorithms generally combine a set of features within bifurcation points. Examples of these algorithms are described in C. Pisupati, L. Wolff, W. Mitzner, E. Zerhouni, "Tracking 3-D Pulmonary Tree Structures", Mathematical Methods in Biomedical Image Analysis, pp. 160-169, 1996, J. Tschirren, K. Palagyi, J. M. Reinhardt, E. A. Hoffman, and M. Sonka, "Segmentation, Skeletonization, and Branchpoint Matching—A Fully Automated Quantitative Evaluation of Human Intrathoracic Airway Trees" SPIE Medical Imaging 2003: Physiology and Function: Methods, Systems, and Applications, pp. 187-194, Vol. 5031, 2003, A. C. M. Dumay, R. v.d. Geest, J. J. Gerbrands, E. Jansen, Johan H. C. Reiber, "Consistent Inexact Graph Matching Applied to Labelling Coronary Segments in Arteriograms", Proc. 11th IAPR, pp. 439-446, Vol. III, 1992, and K. Haris, S. N. Efstratiadis, N. Maglaveras, C. Pappas, J. Gourassas, G. Louridas, "Model-based Morphological Segmentation and Labeling of Coronary Angiograms", IEEE Trans. on Medical Imaging, pp. 1003-1015, Vol 18, October 1999.

These algorithms also use a general graph matching method such as one that finds a maximal clique in an associated graph. Examples of this are described in M. Pelillo, K. Siddiqi, S. W. Zucker, "Matching Hierarchical Structures Using Association Graphs", IEEE Trans. on Pattern Analysis and Machine Intelligence, pp. 1105-1120, Vol. 21, November 1999, and H. Kitaoka, Y. Park, J. Tschirren, J. Reinhardt, "Automated Nomenclature Labeling of the Bronchial Tree in 3D-CT Lung Images", Proceedings of the 5$^{th}$ International Conference on Medical Image Computing and Computer Assisted Intervention-Part II, pp. 1-11, September 2002. These algorithms may also perform graph matching by relaxing fuzzy assignments. An example of this is described in S. Medasani, R. Krishnapuram, Y. S. Choi, "Graph Matching by Relaxation of Fuzzy Assignments", IEEE Trans. on Fuzzy Systems, pp. 173-182, Vol. 9, February 2001.

The above-mentioned tree matching algorithms rely on graph matching techniques and focus on a single application. Although graph matching techniques have a firm theoretical background, they may not be the best choice for real-world medical applications where false or missing branches and differences, and changes in anatomy can occur. Further, prior matching methods exploit the hierarchical structure of a tree to match at a branch-to-branch level. Since these methods view the tree structure as a series of nodes with features computed from the branch data, false branches can reduce the effectiveness of these methods. In addition, some of these methods require a matched starting point for each tree structure, making them useless if this information is not available. This requirement also makes it necessary to perform a preliminary registration of the trees for more accurate results. Further, many prior methods require tree structures that need to be manually generated or edited to avoid these limitations.

SUMMARY OF THE INVENTION

In one embodiment of the present invention, a method for tree matching comprises: acquiring tree-like structures representing a physical object or model; extracting a path from a first tree-like structure and a path from a second tree-like structure; comparing the paths of the first and second tree-like structures by computing a similarity measurement for the paths; and determining if the paths match based on the similarity measurement.

The method further comprises repeating the extracting, comparing, and determining steps until each path of the tree-like structures has been matched or excluded.

The paths are compared according to a hierarchy of one or both of the tree-like structures. The method further comprises: determining if the paths match based on similarity measurements of other paths; generating a matching matrix for recording matched paths; and generating a probability matrix for matching a path to a next-best matching path when a best matching path has already been matched to another path.

The method further comprises aligning the tree-like structures before comparing the paths.

The tree-like structures are airways, arteries or veins. The tree-like structures are acquired by tracking, segmentation, or skeletonization. The paths are extracted by segmentation, centerline extraction or directly from the tree-like structures.

Extracting the paths comprises selecting one of the paths as a basis for the comparison between the paths. A short path, which matches a sub-section of a long path, is selected as the basis for the comparison between the paths. The similarity measurement is a distance feature, an angle feature, a distance variance feature of the paths, or a numerical combination of these features.

In another embodiment of the present invention, a method for matching a path of a tree-like structure to another tree-like structure comprises: acquiring a path from a first tree-like structure, and a second tree-like structure; comparing the path of the first tree-like structure to paths of the second tree-like structure by computing a similarity measurement for the path of the first tree-like structure and the paths of the second tree-like structure; and determining which of the paths of the second tree-like structure best matches the path of the first tree-like structure based on the similarity measurement.

The method further comprises repeating the acquiring, comparing, and determining steps to match the first and second tree-like structures.

The paths of the first and second tree-like structures are compared according to a hierarchy of one or both of the tree-like structures.

The method further comprises: generating a matching matrix for recording matched paths; and generating a probability matrix for matching a path to allow for a next-best matching path when a best matching path has already been matched to another path.

In yet another embodiment of the present invention, a system for tree matching comprises: a memory device for storing a program; a processor in communication with the memory device, the processor operative with the program to: acquire tree-like structures representing a physical object or model; extract a path from a first tree-like structure and a path from a second tree-like structure; compare the paths of the first and second tree-like structures by computing a similarity measurement for the paths; and determine if the paths match based on the similarity measurement.

The processor is further operative with the program code to repeat the extracting, comparing, and determining steps until each path of the tree-like structures has been matched or excluded.

The paths are compared according to a hierarchy of one or both of the tree-like structures.

The processor is further operative with the program code to: determine if the paths match based on similarity measurements of other paths; generate a matching matrix for recording matched paths; and generate a probability matrix for matching a path to a next-best matching path when a best matching path has already been matched to another path.

In another embodiment of the present invention, a system for matching a path of a tree-like structure to another tree-like structure comprises: a memory device for storing a program; a processor in communication with the memory device, the processor operative with the program to: acquire a path from a first tree-like structure, and a second tree-like structure; compare the path of the first tree-like structure to paths of the second tree-like structure by computing a similarity measurement for the path of the first tree-like structure and the paths of the second tree-like structure; and determine which of the paths of the second tree-like structure best matches the path of the first tree-like structure based on the similarity measurement.

The processor is further operative with the program code to repeat the acquiring, comparing, and determining steps to match the first and second tree-like structures.

The paths of the first and second tree-like structures are compared according to a hierarchy of one or both of the tree-like structures.

The processor is further operative with the program code to: generate a matching matrix for recording matched paths; and generate a probability matrix for matching a path to allow for a next-best matching path when a best matching path has already been matched to another path.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

The general framework for path-based tree matching according to an embodiment of the present invention involves comparing a path derived from a tree structure to another path from another tree structure. This is accomplished by performing a point-by-point comparison of the paths by using features that describe the similarities between the paths to obtain a numerical value based on the features. The numerical value is then used to determine whether the paths have been matched.

The path-based tree matching method is independent of graph matching. Since it is based on a point-by-point comparison of complete paths, it is independent from bifurcation points and consequently very robust to false and missing branches. The path-based tree matching method supports irregular tree structures, such as branches with multiple parents or even loops that are caused by imperfect segmentation and centerline extraction.

Although these features are obtained by avoiding hierarchy, matching of an entire tree with hierarchical constraints can occur in a robust way, for example, by using branch-constraints in accordance with an embodiment of the present invention. In addition, although the path-based tree matching method enables many-to-one path mapping, one-to-one path mapping can be enforced by a matching matrix. Further, although the path-based tree matching method may require more processing time than a general graph matching algorithm, various optimizations will be discussed that can be used to decrease the running time.

A system and method for path-based tree matching according to an embodiment of the present invention will now be described in detail.

Figure 1:
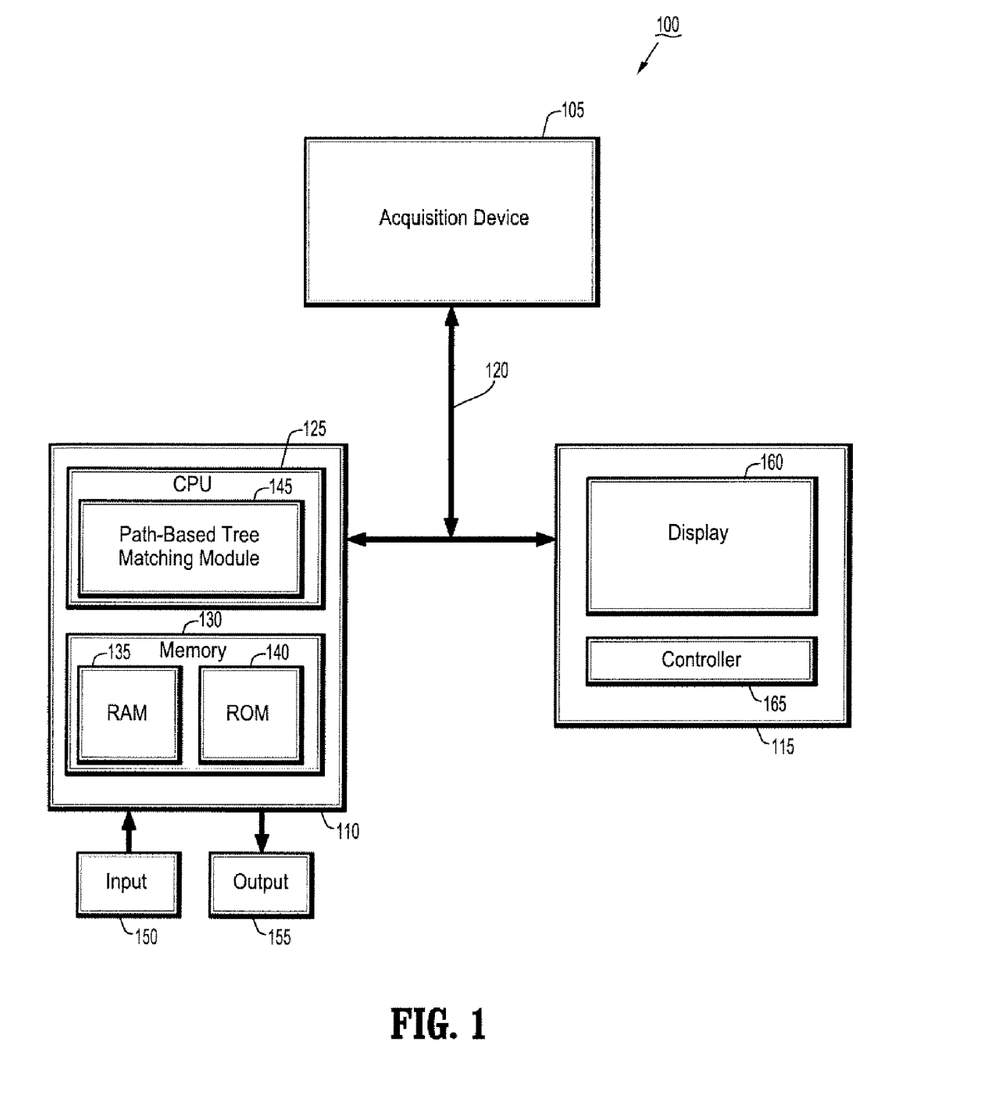
FIG. 1 is a block diagram illustrating a system for path-based tree matching according to an exemplary embodiment of the present invention.

FIG. 1 is a block diagram illustrating a system 100 for path-based tree matching according to an embodiment of the present invention. As shown in FIG. 1, the system 100 includes an acquisition device 105, a PC 110 and an operator's console 115 connected over a wired or wireless network 120.

The acquisition device 105 may be a magnetic resonance (MR) imaging device, computed tomography (CT) imaging device, helical CT device, positron emission tomography (PET) device, single photon emission computed tomography (SPECT) device, hybrid PET-CT device, hybrid SPECT-CT device, 2D or 3D fluoroscopic imaging device, 2D, 3D, or 4D ultrasound (US) imaging device, or an x-ray device. In addition, the acquisition device may be a multi-modal or hybrid acquisition device that is capable of acquiring images, for example, in a PET mode, SPECT mode or MR mode.

The PC 110, which may be a portable or laptop computer, a medical diagnostic imaging system or a picture archiving communications system (PACS) data management station, includes a CPU 125 and a memory 130 connected to an input device 150 and an output device 155. The CPU 125 includes a path-based tree matching nodule 145 that includes one or more methods for performing path-based tree matching to be discussed hereinafter with reference to FIGS. 2-6. Although shown inside the CPU 125, the path-based tree matching module 145 can be located outside the CPU 125.

The memory 130 includes a RAM 135 and a ROM 140. The memory 130 can also include a database, disk drive, tape drive, etc., or a combination thereof. The RAM 135 functions as a data memory that stores data used during execution of a program in the CPU 125 and is used as a work area. The ROM 140 functions as a program memory for storing a program executed in the CPU 125. The input 150 is constituted by a keyboard, mouse, etc., and the output 155 is constituted by an LCD, CRT display, or printer.

The operation of the system 100 may be controlled from the operator's console 115, which includes a controller 165, for example, a keyboard, and a display 160. The operator's console 115 communicates with the PC 110 and the acquisition device 105 so that image data collected by the acquisition device 105 can be rendered by the PC 110 and viewed on the display 160. It is to be understood that the PC 110 can be configured to operate and display information provided by the acquisition device 105 absent the operator's console 115, using, for example, the input 150 and output 155 devices to execute certain tasks performed by the controller 165 and display 160.

The operator's console 115 may further include any suitable image rendering system/tool/application that can process digital image data of an acquired image dataset (or portion thereof) to generate and display images on the display 160. More specifically, the image rendering system may be an application that provides rendering and visualization of medical image data, and which executes on a general purpose or specific computer workstation. It is to be understood that the PC 110 can also include the above-mentioned image rendering system/tool/application.

Figure 2:
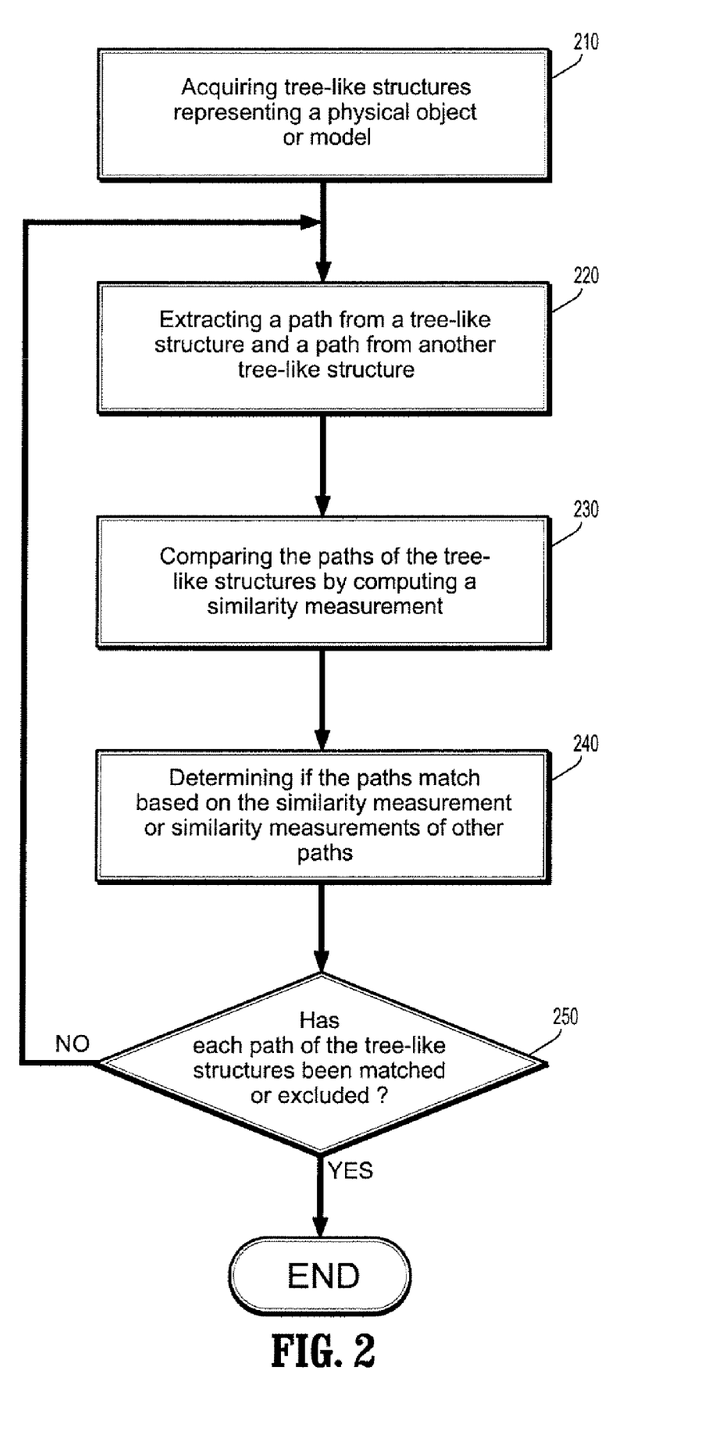
FIG. 2 is a flowchart illustrating a method for path-based tree matching according to an exemplary embodiment of the present invention.

FIG. 2 is a flowchart showing an operation of a method for path-base tree matching according to an embodiment of the present invention.

As shown in FIG. 2, tree-like structures representing a physical object or model are acquired (210).

In the path-based tree matching method, a tree T is a collection of doubly linked, directed branches B=($S_B$, $P_B$, $C_B$), which contains a set of equidistant sites $S_B$, links to its parents $P_B$ (e.g., one in the airways and arteries), and links to its children $C_B$ (e.g., two or more in the airways or arteries). A branch with no parents $P_B=\phi$ is defined as a root branch while branches without any children $C_B=\phi$ are defined as terminal branches. A set of sites $S_B$ is a vector of ordered, equidistant 3-D coordinates with a first site defined as a start site and a last site defined as a terminal site of $S_B$. In addition, since a branch is always considered to be a child or a parent, the tree contains an inherent hierarchy. Assuming no loops, each branch belongs to a certain generation number, with the root branch at generation 0, the root's child branches at generation 1, and so forth.

The tree-like structures may be of any branching tubular structure such as an airway, artery, vein or duct system. The branching tubular structure may be acquired, for example, by using the acquisition device 105, such as a CT scanner, to scan a patient's chest to generate a series of 2D image slices associated with the lungs. The 2D image slices of the lungs are then combined to form a 3D image.

In addition to the lungs, it is to be understood that the branching tubular structure may be acquired from any body part such as the liver, legs or brain. In addition, other types of data acquired from an MRI device or any imaging device associated with the various modalities of the acquisition device 105 may be used in accordance with an embodiment of the present invention.

Once the tree-like structures have been acquired, a path is extracted from each of the structures (220).

A path is a combination of one or more directly linked branches starting at any site within the first branch and ending at any site of the last involved branch. A complete path is defined as a path starting at the root site of the root branch and ending at the terminal site of any terminal branch. Because of this hierarchy, any complete path will always contain the root branch. The paths may be extracted by any segmentation, centerline extraction or capturing method.

After extracting a path from each of the tree-like structures, the paths are compared to each other by computing a similarity measurement between the paths (230). This measurement is determined by using a function that compares points from one path to points in the other path. Here, one of the paths is chosen as the basis for comparison.

It is to be understood that it may be more effective to elect a shorter path of the two for the comparison path since, assuming the shorter path matches a sub-section of a longer path, it avoids using points in the site-by-site comparison that have no equivalent counterparts. However, using the longer path is feasible and does not limit the application of the path-based tree matching method. For example, matching arteries to peripheral bronchi can be accomplished, even though a complete airway path may have a root site that begins more proximally, while the arterial path will most likely extend further into the periphery.

After choosing start and end sites within the basis or original tree, the original path is created by merging all sites in between into one structure that does not contain hierarchal information, i.e., all notions of parent and children branches are eliminated and we are left with a series of sites.

Many different similarity features can be used to compare the paths. Three examples include: Distance, Angle, and Variance. The Distance feature represents the offset between the paths, the Angle feature describes the differences in path directions, and the Variance feature calculates the changes of the offset between them. Other features may also be used to compare the paths. Although the choice of optimal features depends on the application, the features described work well in a general case. Other numerical features can be easily incorporated into the path-based tree matching method.

The Distance feature describes the mean squared distance between the paths to be compared. It is calculated by summarization of the squared distance between each site of the original path and its closest site within the comparison path. Afterwards the sum is divided by the number of sites of the original path. Since all sites of each branch are located equidistant, the number of sites is equivalent to the length of the path.

$$d = \frac{1}{i_{max}} \sum_i (p_i - C(p_i | q))^2 \qquad (1)$$

with $p_i$=site i of the original path and $C(p_i|q)$=closest site in path q of the comparison structure to $p_i$.

The Angle feature estimates the mean difference of the directions of the two paths to be compared. Since a straight line representation of the branches is not used, the direction of the path at each site might be slightly different. To calculate the exact difference it is necessary to know which site of the original path corresponds to which site of the comparison branch. Since this relation is not known a priori, the difference between the direction of the tangent at each site of the original path and the direction at the closest site of the comparison path is used. Afterwards the sum is divided by the number of points of the original path.

$$a = \frac{1}{i_{max}} \sum_i \angle(\vec{p}_i, \overrightarrow{C(p_i | q)}) \qquad (2)$$

with $\vec{p}_i$=direction at site i of the original path and $\overrightarrow{C(p_i|q)}$=direction at the closest site in path q of the comparison structure to $p_i$.

The Variance feature is the variance over the above-described distance feature.

$$v = \frac{1}{i_{max}} \sum_i [(p_i - C(p_i | q))^2 - d]^2 \qquad (3)$$

with $p_i$=site i of the original path and $C(p_i|q)$=closest site in path q to $p_i$ and d is the mean squared distance.

Once these features have been calculated, it is determined whether the paths match (240).

This is accomplished, for example, by applying these features to a complete path of the comparison tree to yield a distance vector with respect to the original path. To convert this vector into a single value a simple combination method referred to as the Normed combination is used. The Normed combination takes into account the variability of each component. Here, components with high variability receive less weight than components with low variability. This is obtained by rescaling each component by its variance. The norm of the distance vector $\underline{x}$ equals:

$$\|\underline{x}\|_N = \sqrt{\left(\frac{x_1}{\sigma_1}\right)^2 + \left(\frac{x_2}{\sigma_2}\right)^2 + \ldots + \left(\frac{x_n}{\sigma_n}\right)^2} = \sqrt{\underline{x}^t \cdot \underline{V}^{-1} \cdot \underline{x}} \qquad (4)$$

where $\underline{V}$ is the matrix of the variances, with the variances on the main diagonal and zero values everywhere else. As a result, each complete path of the comparison tree has a single value that represents its similarity to the original path. Here, the path with the smallest value becomes the best match. In the case of paths with equally small values, one can be chosen at random, or a more advanced analysis can be performed based on agreement with existing matches.

When matching complete trees using the path-based tree matching method, a many-to-one matching may occur since matching is done path-by-path without consideration of existing match assignments. In other words, although each path in the original tree has only one match to a path in the comparison tree, a given path in the comparison tree may be matched to more than one path in the original tree. A one-to-one matching may be achieved by first calculating a complete distance matrix and afterwards choosing the best matches based on this matrix.

Since two paths are being matched, various line-based features may be used to determine the similarity measurement. The similarity measurement may also be based on transforms between two curved 3D lines. Features such as curvature and any other measure of a function of a series of points can also be used. For example, a high-order polynomial can be fit to the path and its equation can be used for a comparison. In addition, a combination of these features can be used to increase the robustness of the path-based tree matching method.

A description of using the path-based tree matching method for matching entire tree structures follows. For example, instead of manually indicating a path in the original tree for which a match is desired, each complete path can be automatically selected and matched to another complete path within the other tree. This can be repeated for each possible complete path until all paths within the trees are matched (250).

It is to be understood however, that before matching entire tree structures, some sort of alignment of the tree structures may be necessary to accommodate the features to be calculated, specifically the Distance feature. This alignment may be accomplished in most applications by using the major branching points of tree structures. This alignment can be done automatically. In airway-to-artery matching, the alignment process may not be possible due to differences in the root sites (e.g., trachea for the airways and heart for the arteries).

Since other features such as Angle and Distance Variation are more independent of path location, the tree structures do not have to be aligned because they are less sensitive or immutable to affine transformations. These features would most likely require additional constraints for proper matching since they allow for many possible matches. For example, these features may allow for airway paths in the left lung and right lung to be matched to a path in the right lung of the second tree. Therefore, additional constraints may be needed to prevent something like this from occurring.

One-to-one matching constraints can be added by use of a matching matrix. Since the path-to-path matching can produce a many-to-one mapping, a matrix of the matches can be created for the purposes of constraining the match to a one-to-one. This matrix consists of all possible paths of the first tree listed in the rows, while all possible paths of the second tree are listed in the columns. Each entry in the matrix contains the measure of the match between two paths. By iteratively selecting the absolute minimal distance of all distance values, handling ties as mentioned before, and labeling the involved paths as matched and disregarding these for further matching, a one-to-one match constraint can be enforced.

Since the original path might have no equivalent in the comparison tree, the one-to-one matching constraint might not have the proper result and end up in a chain of false labeling if an early match is done incorrectly. Therefore, a probability matrix, which tries to create a one-to-one match but also provides the possibility for many-to-one matching in single cases, is introduced. Thus, matched paths are not completely disregarded for further matches.

For example, when the best matching path is already matched, the next best unmatched path, whose difference measurement is only slightly higher, becomes a higher probability than the best match. When there are no further paths found that fulfill these requirements, the already matched path is labeled as the best match and the probability of this match and the already existing matches of this path are decreased by the number of assigned matches. By using the matching matrix, one-to-one matching can be imposed by preventing certain matches from being allowed given the score of a previous match. This matrix is just one of the ways constraints can be formed within this framework.

Given the matched paths, it can be determined which branches within those paths are corresponding. Hence, a branch-to-branch matching can be derived from the results. This may be accomplished by creating match votes for each branch or series of points that are matched via the matched paths. Branches that are matched more often are matched first. For example, if n matched paths implicitly match the same two branches, that branch match receives n votes. This voting scheme can be used not only to determine which branches are matched together, but also to determine a confidence based on the number of votes a given branch match receives, and the number of votes the second contender receives. This confidence factor can be used to influence further processing steps.

For example, in a registration method, matches with greater confidence can have greater influence on the registration model. Low confidence regions can also be presented to the user to allow for a quick semi-automatic interface. In addition, since a series of sites are matched, one branch in the original tree can be matched to two branches in the other tree. This case can occur if a false branch splits a true branch into two parts.

The use of branch matching also allows for hierarchy constraints. Two branches that are matched with high confidence can dictate that all other possible paths containing these branches must match at the sites of these branches. In addition, once branches are matched, a recursive process may take place such that the ends of the matched branches function as root sites as the procedure repeated again. This recursive method allows for the use of the hierarchical constraints while at the same avoiding some drawbacks of graph matching based methods.

Since the path-based tree matching method may require more processing time than a general graph-matching algorithm, several optimizations to be described below can be used to increase the speed of the method.

First, since the comparison operations are independent of each other, the path-based tree matching method is open for a multi-threaded implementation. This allows for potentially twice the speed on a dual-processor computer or even faster on a computer with even more processors. Second, distant or very unlikely path matches can be easily identified to avoid more costly comparison steps. Third, after identifying an optimal feature combination, the calculation of the individual features for each comparison pair could be optimized and the calculation time for each feature set would not be much more than the current calculation time of a single feature. Since the features are point based, the calculation time is dependent on the number of sites that define the path. In some cases the necessary distance between the sites to achieve optimal results might be increased, which immediately decreases the computation time for each feature calculation.

In another optimization, the matching matrix and hierarchical constraints based on existing matches can be used to predict which paths should not be compared. Thus, although classical graph matching may be innately faster, the use of these optimizations can significantly reduce the time required for the path-based tree matching method. However, in applications such as bronchoscopy planning, which requires only matches of a single path, the path-based tree matching method can outperform graph-matching approaches, since the entire matching process does not have to be performed.

An example of the speed difference when not considering all branches as possible matches will now be described. Here, the time for matching a tree with 44 paths to a tree with 66 paths using one feature is 4 min 28 sec. Since every original path is compared with every comparison path, the feature is calculated about 2900 times with a mean processing time of 92.2 ms, depending on the number of sites within each path. An a-priori identification of the bifurcation points between, for example, the right/left Upper Lobe Bronchus and right/left Truncus Inter Medius, divides the original tree into four parts resulting in approximately a four-fold speed increase. Other comparison features such as general distance can also be used to determine which paths do not have to be compared.

Figure 3:
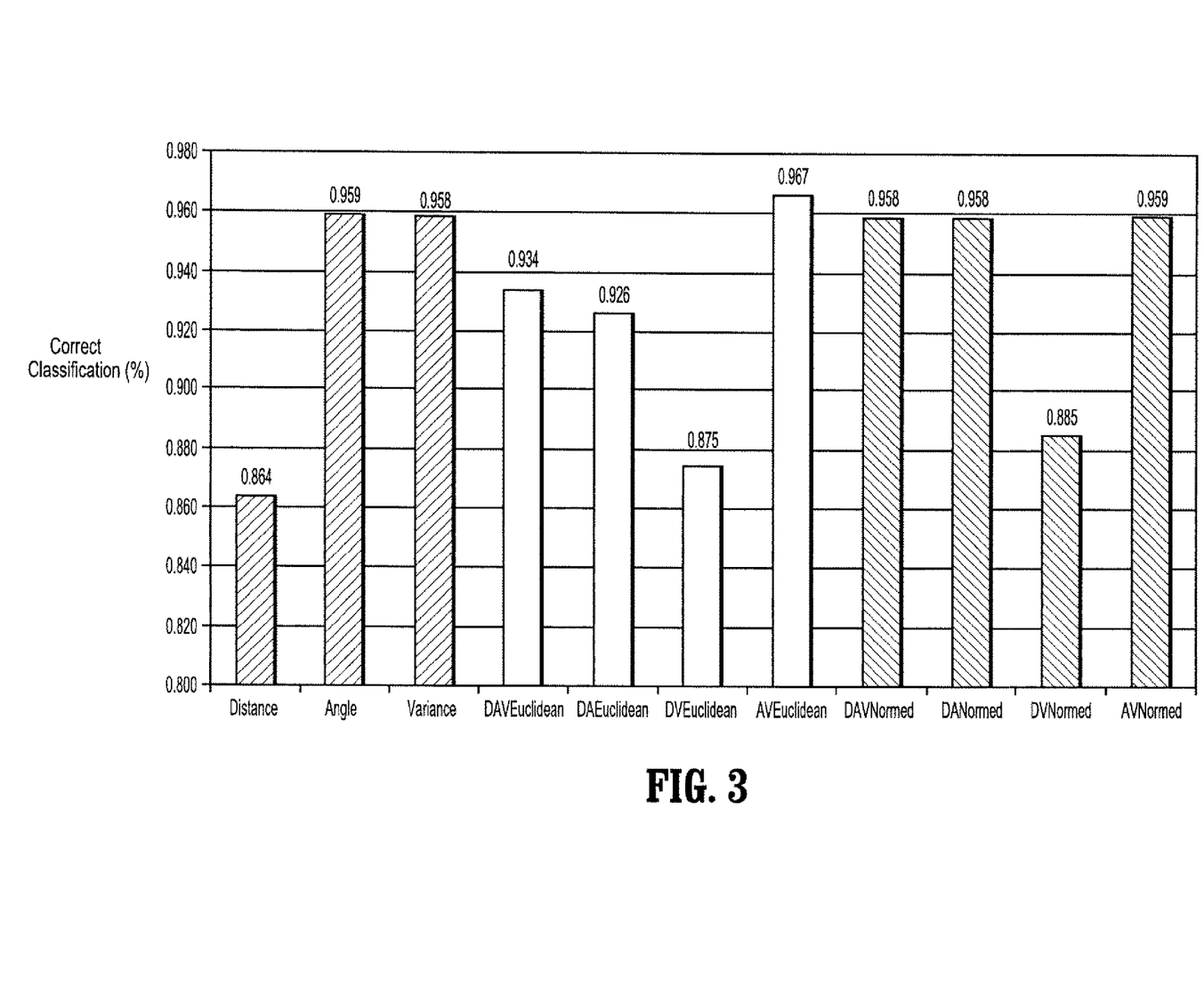
FIG. 3 is a bar chart illustrating accuracy results of an airway sub-tree matched to a synthetic tree by the method of FIG. 2.

The path-based tree matching method has been tested on airway-to-airway and airway-to-artery matching with excellent results. For a first validation, a part of an airway tree was matched to synthetically generated comparison trees. The artificial trees were created by using the original data as a basis and then modifying the data. First, a random offset within a parameter-specified range was added to each site to simulate the positioning differences between the trees. Next, a Gaussian distributed noise with a parameterized variance was added to the site to simulate other possible sources of differences such as breathing. By using this technique, the influence of noise and offset on the robustness of the features for matching was easily examined. The validation results of more than 5000 path matches are shown in FIG. 3. The experiment producing the results shown in FIG. 3 included the validation of the three features D(istance), A(ngle), V(ariance), Euc(lidean) and Norm(ed) in all combinations with 75 different parameter settings for the offset and noise. Here, the matching results were compared to a ground truth to determine the rate of correct classifications.

As shown in FIG. 3, the Angle and Variance features achieve correct matching results of over 95% when each is applied alone. Only the Distance feature when applied alone does not obtain results that are as good as the results obtained by the other features. However, with a correct classification of around 85%, the Distance feature when applied alone is not completely useless (note that the y-axis in FIG. 1 does not begin at zero). Since the range of the Euclidean combination is higher than the range of the Variance feature, it is influenced by the results of the Distance feature. As a result, the Euclidean combination of Angle and Variance achieves outstanding results. By contrast, the Normed combination does not seem to be affected much by lower feature performance while the Euclidean combination is, and thus, most combinations achieve correct matching results of over 95%. The Distance and Variance feature combination is less accurate but still more reliable than the Distance feature alone.

Figure 4:
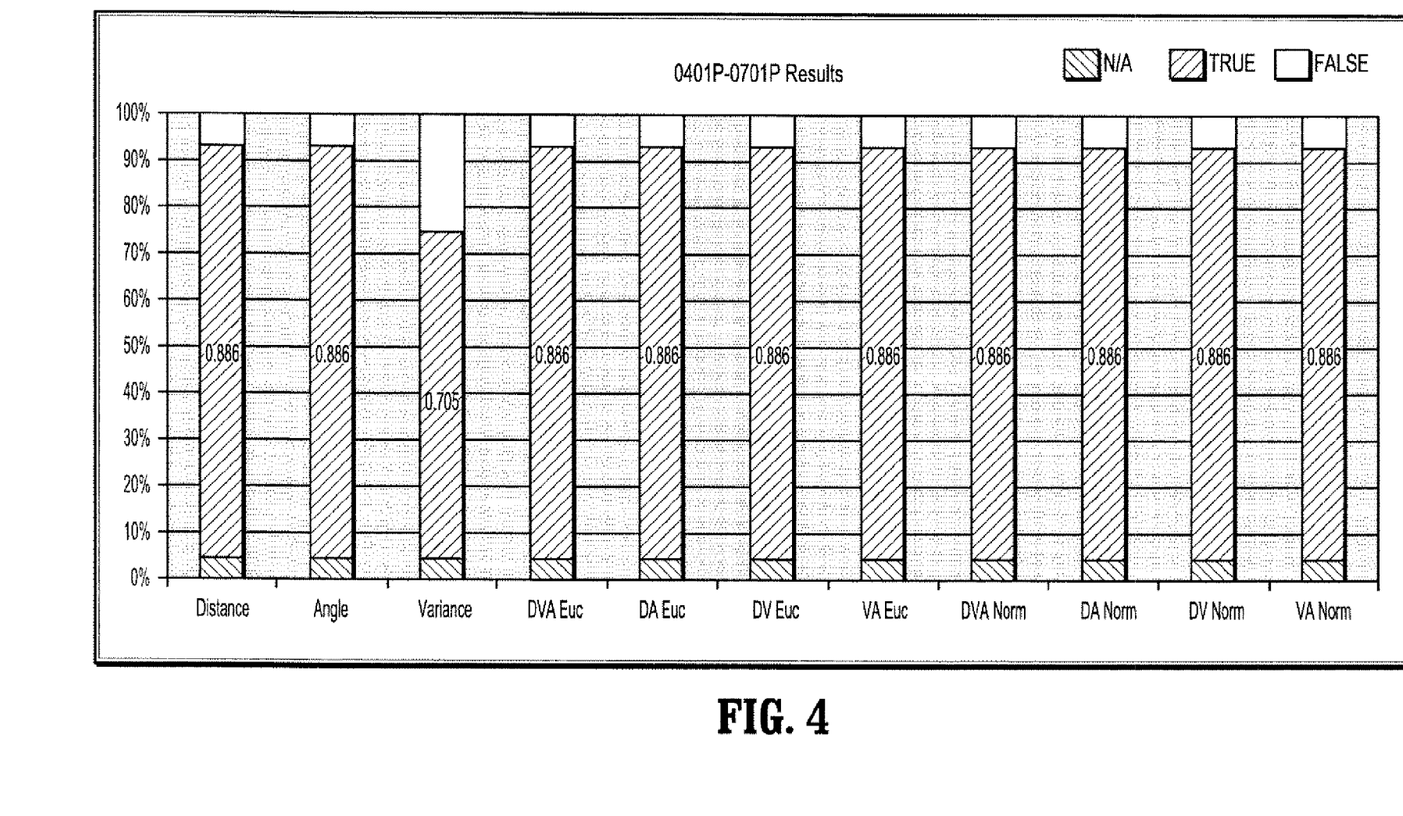
FIG. 4 is a bar chart illustrating accuracy results of airway trees of a same patient extracted at different times matched by the method of FIG. 2.

FIG. 4 illustrates matching results between extracted airway trees of patients and a follow up acquisition of the same patients several months later. Here, the D(istance), A(ngle), V(ariance), Euc(lidean) and Norm(ed) combination in all variations were tested. Since the first airway segmentation contained branches, which were not segmented in the follow-up tree, a complete accurate matching cannot occur. Paths corresponding to these additional branches are labeled as "N/A". The matching results were compared to a ground truth to determine "true" (e.g., correct) and "false" (e.g., incorrect) classifications.

Figure 5:
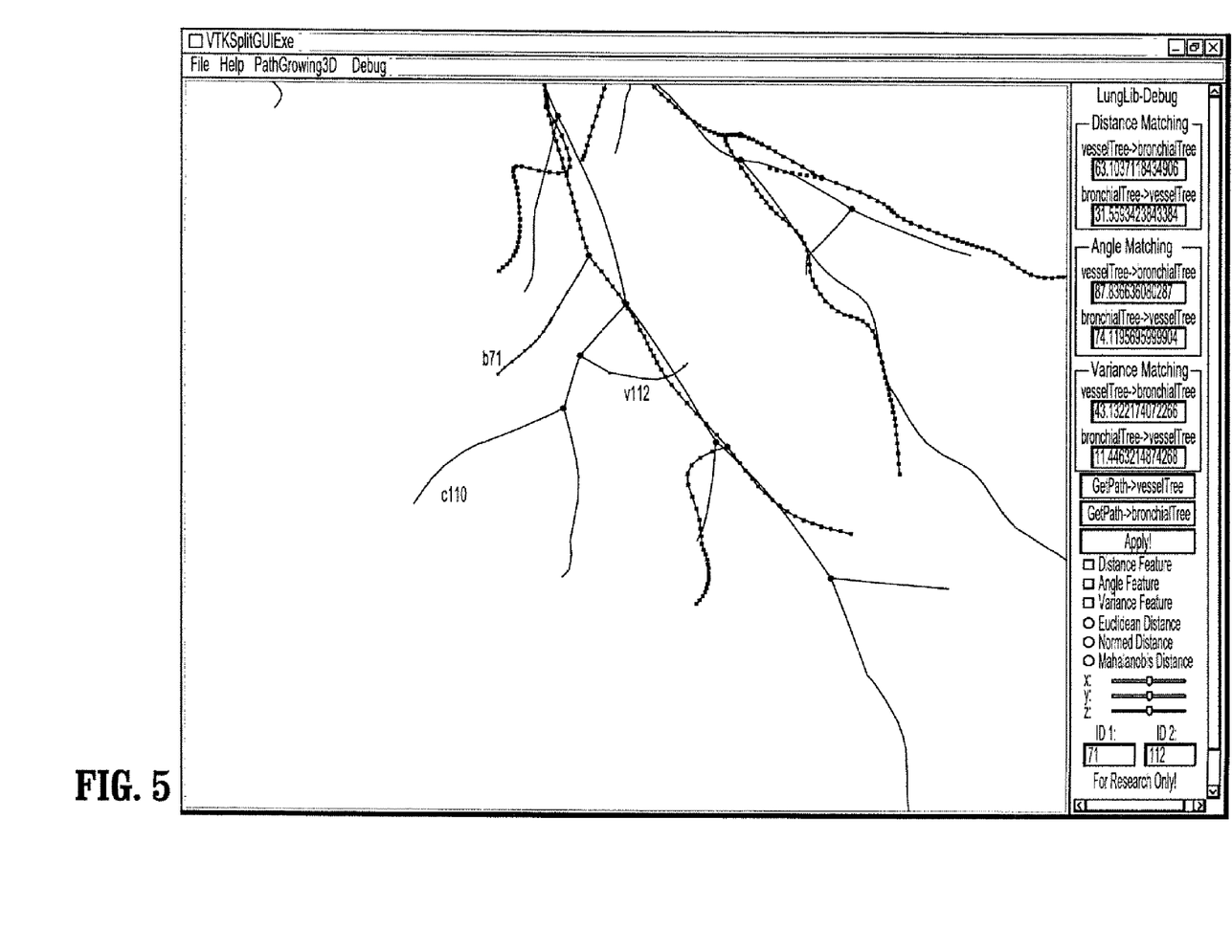
FIG. 5 is an example of two trees matched by the method of FIG. 2.

Overall, the matching included 44 paths, consisting of 83 branches with an average of 7.75 branches per path. Without using the matching matrix a false matching rate of 6.8% (e.g., 3 out of 44) was achieved using any feature except Variance. By introducing the matching matrix, the D(istance), V(ariance), and Norm(ed) combination could be improved, for example, by two additional correct matches, resulting in a false matching rate of 2.3% of the paths. Additionally, the majority of false matches only contained errors in terminal branches. Hence, even paths that are labeled as false matches may be correct over most of the branches. As shown in FIG. 5, two trees (e.g., an original tree indicated by thick dotted lines and a comparison tree indicated by thin dotted lines) contain differences in the number and length of branches, yet the path-based tree matching method successfully matches the majority of the branches and paths. An evaluation of the path-based tree matching method on a branch level can also be performed, since, given the path matches, a branch-to-branch mapping can be constructed.

Figure 6:
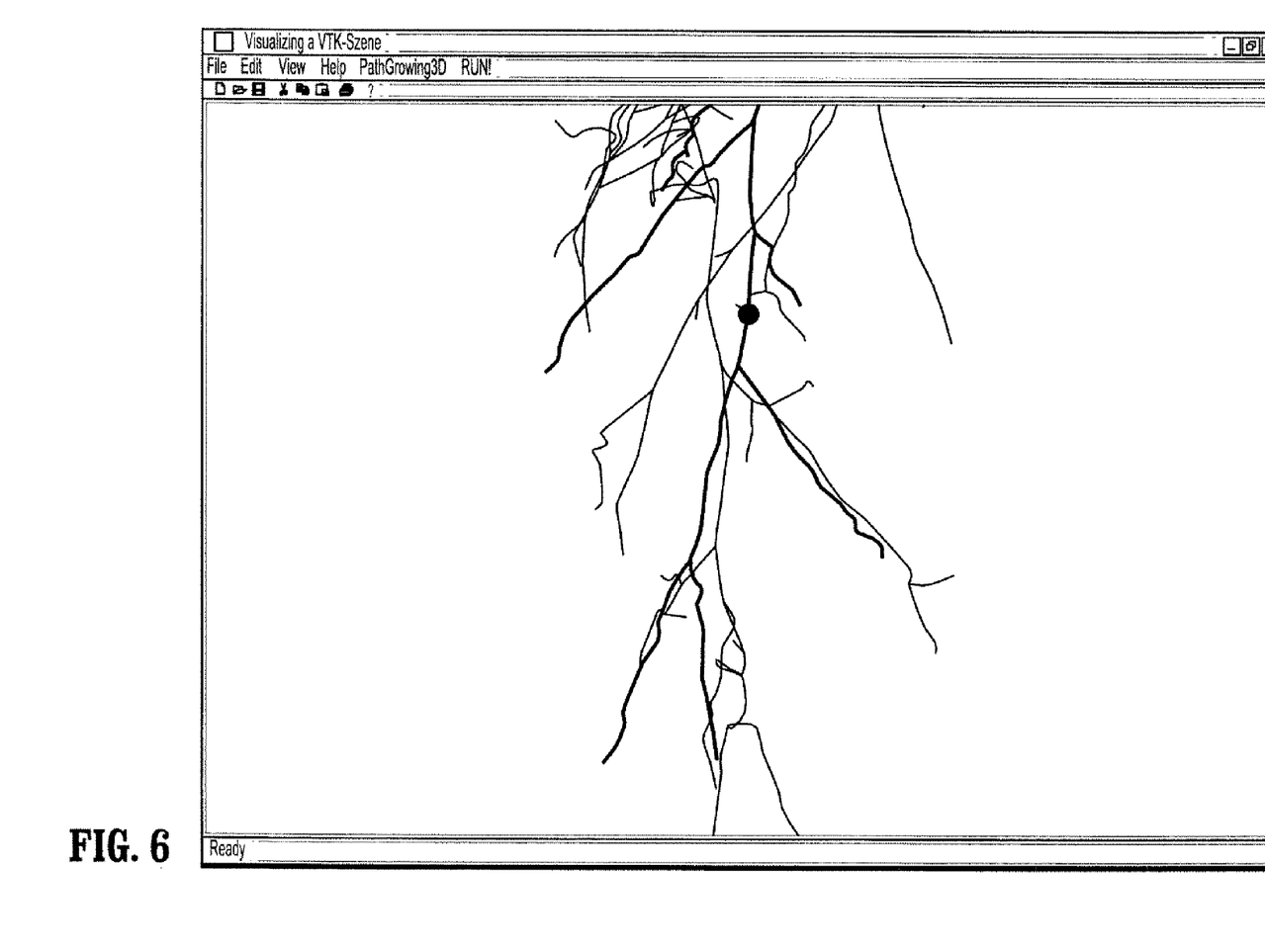
FIG. 6 is an example of airway and arterial paths matched by the method of FIG. 2.

FIG. 6 illustrates matching between airway and arterial paths. Here, a start site indicated by a large circle within the bronchial tree is manually selected. Afterwards the vessels within a sub-volume around the start site are automatically segmented and captured into a tree structure by selecting a random root site within the vessel segmentation close to the start site. Afterwards all paths beginning at the start site and ending at terminal sites of all descendant terminal branches are matched to all complete paths within the vessel tree. The chosen matched paths without using any matching matrix are given the same color in the two trees, with the original tree rendered in thick lines and the comparison tree rendered in thin lines. When sites from two different matches are overlapped, the color of the latest matched path is given to all sites in the overlapping region. The results of this coloring procedure appear similar to a branch-to-branch coloring.

The path-base tree matching method according to an embodiment of the present invention is applicable to a variety of tree matching applications. Existing methods rely on graph matching techniques that have stricter requirements and are more easily hampered by false branches. However, the path-based tree matching method allows the flexibility of having root branches at different portions of the tree while yielding successful matches. In addition, the path-based tree matching method allows for two branches in one tree to be matched to a branch in the comparison tree to accommodate a false middle branch, which is difficult to realize in a standard node-based matching method.

It is to he further understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for tree matching, comprising:
   using a processor to carry out the steps of:
   acquiring first and second tree-like structures representing a physical object or model, wherein each tree-like structure includes a plurality of paths;
   comparing a first path of the first tree-like structure to each path of the second tree-like structure, wherein a similarity measurement is computed for each path to which the first path is compared; and
   identifying the path of the second tree-like structure that matches the first path as the path with the lowest similarity measurement,
   wherein the similarity measurement for a path to which the first path is compared is computed by calculating a mean distance between the path and the first path, a mean difference between directions of the path and the first path and a variance in the distance between the path and the first path.

2. The method of claim 1, further comprising:
   using the processor to carry out the step of:
   repeating the comparing and identifying steps until each path of the tree-like structures has been matched or excluded.

3. The method of claim 2, wherein the paths of the tree-like structures are compared according to a hierarchy of one or both of the tree-like structures.

4. The method of claim 3, further comprising:
   using the processor to carry out the step of:
   determining if the paths of the tree-like structures match based on similarity measurements of other paths of the tree-like structures.

5. The method of claim 4, further comprising:
   using the processor to carry out the step of:
   generating a matching matrix for recording matched paths.

6. The method of claim 4, further comprising:
   using the processor to carry out the step of:
   generating a probability matrix for matching a path to a next-best matching path when a best matching path has already been matched to another path.

7. The method of claim 2, further comprising:
   using the processor to carry out the step of:
   aligning the tree-like structures before comparing the first path to the paths of the second tree-like structure.

8. The method of claim 1, wherein the tree-like structures are airways, arteries or veins.

9. The method of claim 1, wherein the tree-like structures are acquired by tracking, segmentation, or skeletonization.

10. The method of claim 1, further comprising:
    using the processor to carry out the step of:
    extracting paths from the tree-like structures, prior to comparing the paths, wherein the paths are extracted by segmentation, centerline extraction or directly from the tree-like structures.

11. The method of claim 10, wherein extracting the paths comprises selecting one of the paths of one of the tree-like structures as the path to be compared to the paths of the other tree-like structure.

12. The method of claim 11, wherein a short path, which matches a sub-section of a long path, is selected as the path of one of the tree-like structures to be compared to the paths of the other tree-like structure.

13. A system for tree matching, comprising:
    a memory device for storing a program;
    a processor in communication with the memory device, the processor operative with the program to:
    acquire first and second tree-like structures representing a physical object or model, wherein each tree-like structure includes a plurality of paths;
    compare a first path of the first tree-like structure to each path of the second tree-like structure, wherein a similarity measurement is computed for each path to which the first path is compared; and
    identify the path of the second tree-like structure that matches the first path as the path with the lowest similarity measurement,
    wherein the similarity measurement for a path to which the first path is compared is computed by calculating a mean distance between the path and the first path, a mean difference between directions of the path and the first path and a variance in the distance between the path and the first path.

14. The system of claim 13, wherein the processor is further operative with the program to:
    repeat the comparing and identifying steps until each path of the tree-like structures has been matched or excluded.

15. The system of claim 14, wherein the paths of the tree-like structures are compared according to a hierarchy of one or both of the tree-like structures.

16. The system of claim 15, wherein the processor is further operative with the program to:
    determine if the paths of the tree-like structures match based on similarity measurements of other paths of the tree-like structures.

17. The system of claim 16, wherein the processor is further operative with the program to:
    generate a matching matrix for recording matched paths.

18. The system of claim 16, wherein the processor is further operative with the program to:
    generate a probability matrix for matching a path to a next-best matching path when a best matching path has already been matched to another path.

19. The system of claim 14, wherein the processor is further operative with the program to:
    align the tree-like structures before comparing the first path to the paths of the second tree-like structure.

20. The system of claim 13, wherein the tree-like structures are airways, arteries or veins.

21. The system of claim 13, wherein the tree-like structures are acquired by tracking, segmentation, or skeletonization.

22. The system of claim 13, wherein the processor is further operative with the program to:

extract paths from the tree-like structures, prior to comparing the paths, wherein the paths are extracted by segmentation, centerline extraction or directly from the tree-like structures.

23. The system of claim 22, wherein extracting the paths comprises selecting one of the paths of one of the tree-like structures as the path to be compared to the paths of the other tree-like structure.

24. The system of claim 23, wherein a short path, which matches a sub-section of a long path, is selected as the path of one of the tree-like structures to be compared to the paths of the other tree-like structure.

25. A computer readable storage medium storing instructions that, when executed by a computer, cause the computer to perform a method for tree matching, the method comprising:

acquiring first and second tree-like structures representing a physical object or model, wherein each tree-like structure includes a plurality of paths;

comparing a first path of the first tree-like structure to each path of the second tree-like structure, wherein a similarity measurement is computed for each path to which the first path is compared; and identifying the path of the second tree-like structure that matches the first path as the path with the lowest similarity measurement, wherein the similarity measurement for a path to which the first path is compared is computed by calculating a mean distance between the path and the first path, a mean difference between directions of the path and the first path and a variance in the distance between the path and the first path.

* * * * *